March 17, 1925.
C. F. JENKINS
RADIO VISION MECHANISM
Filed April 23, 1924
1,530,463
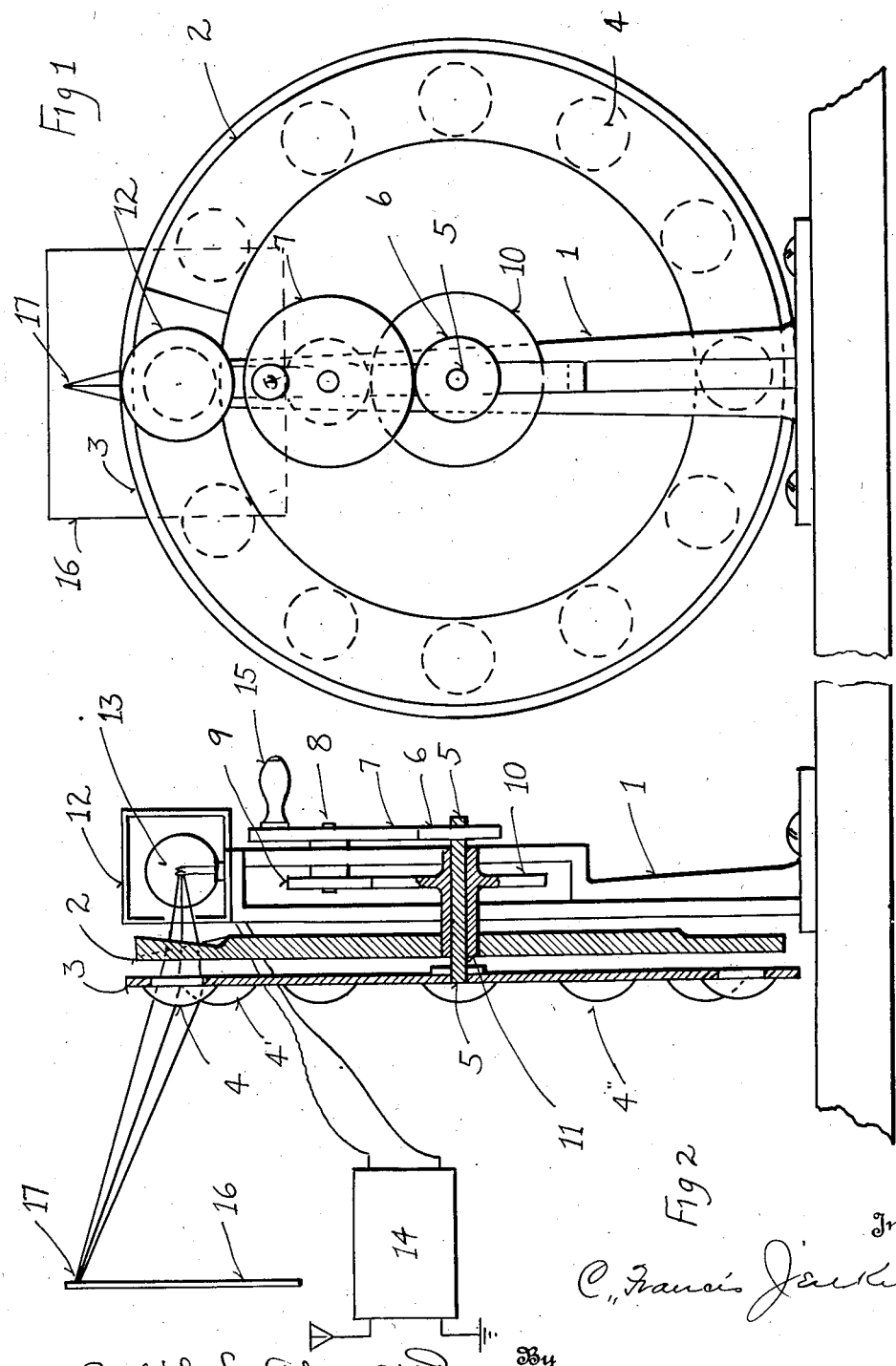

Patented Mar. 17, 1925.

1,530,463

UNITED STATES PATENT OFFICE.

CHARLES FRANCIS JENKINS, OF WASHINGTON, DISTRICT OF COLUMBIA.

RADIO VISION MECHANISM.

Application filed April 23, 1924. Serial No. 708,531.

REISSUED

*To all whom it may concern:*

Be it known that I, CHARLES FRANCIS JENKINS, citizen of the United States, residing at Washington, District of Columbia, have invented certain new and useful Improvements in Radio Vision Mechanism, of which the following is a specification.

This invention relates to that class of instruments employed in radio vision, i, e., in the reception of radio signals representing active scenes, broadcasted from some distant sending station; and has for its main object the association of such parts as permit high speed and the required number of lines per inch for quality in the reproduction.

In the drawings Fig. 1 is an elevation of the instrument, and Fig. 2 a sectional view; in both of which 1 is a supporting arm; 2 a prismatic plate (the subject of Patent No. 1,385,325); 3 a perforated disc having lens 4, 4', 4", etc., mounted thereon. The lens disc 3 is mounted on the shaft 5, on the opposite end of which a gear 6 is fastened. Gear 6 engages with a larger gear 7 on the shaft 8 together with the gear 9, which latter meshes with the gear 10 on the sleeve shaft 11 upon which latter the prismatic disc is carried, the gear sizes being such as to multiply the rotative speed of lens disc 3 over the prism disc 2. On the upper end of the arm 1 a lantern 12 is supported, enclosing lamp 13, which is attached to a suitable radio set 14. 15 is a crank by which the mechanism may be rotated. 16 is a screen upon which the picture appears.

The filament of the lamp 13 is imaged through the lens 4 onto the screen 16 as a point of light 17. The movement of the lens, by reason of the rotation of the disc, causes this point of light to move from left to right (Fig. 1) in an arc across the screen 16, and as the light beam passes through the prism 2 it is deflected from the centre line of the optical system and travels across the screen near the top. The following lens does exactly the same thing, that is, it makes the spot of light move across the screen from left to right, as does every other succeeding lens. These lines of light would all fall in the same place except for the fact that the prismatic ring is rotating, and, therefore, because the prism, radially considered, behind each lens is angularly less, the lines of light on the screen lie adjacent and parallel in a horizontal direction until with one turn of the prism (2) the screen has been covered with parallel lines from top to bottom, the lines being made by the lenses, and their disposition on the screen determined by the prismatic ring or plate or disc.

As each lens makes its own individual line and does not repeat until the lens disc has made one complete circle, the first lens considered will make the first line, the 13th line, the 25th line, etc., while the next lens will make the 2nd line, the 14th line, the 26th line, etc. The number of lines over the whole screen is. therefore, determined by the number of lenses on the disc multiplied by the ratio of the gears which connect the lens disc and the prism disc. For example, if the lens disc has 12 lenses thereon, and the gear ratio is six to one, there will be 72 parallel lines from the top to the bottom of the screen. Of course, the number of lenses and the gear ratio may be anything desired.

As the incoming radio signal increases and decreases the intensity of the light source (13), obviously the brilliancy of the spot on the screen is determined by the strength of the incoming radio signals at the moment considered. If, therefore, the rotation of the mechanism is in synchronism with the rotation of the mechanism at the sending station; and the incoming signals represent in their strength the light value of the picture at the sending station, it will readily be seen that the picture on the screen 16 will be a duplicate of the active scene in front of the lens at the sending station, assuming the speed of the two machines to be such that by reason of persistence of vision the eye is deceived into the belief that it is looking at the whole of the picture all of the time.

Of course, I do not wish to limit myself to circularly moving lenses or to a circular prism as it is quite obvious that other combinations of lenses and a constantly angularly-changing prism may be employed without departing from the spirit of my invention.

What I claim, therefore, as my invention, and wish to protect by Letters Patent of the United States, is—

1. The combination of a prismatic disc and a lens-carrying disc, and means for rotating one in front of the other.

2. The combination of a prismatic disc and a lens-carrying disc, and connecting means for rotating one disc in front of the other, and at differing speeds.

3. The combination of a series of lenses, means for passing a pencil of light through said lenses in succession, a prism through which the light pencil also passes, and means for changing the angle between the faces of the prism at the point where the light passes therethrough.

4. The combination of a prismatic disc, a sleeve-mounting for same, a lens-carrying disc, a shaft-mounting therefor, said shaft supported inside said sleeve, and a gear connection between to give the sleeve and shaft different rates of rotation.

In testimony whereof I have affixed my signature.

CHARLES FRANCIS JENKINS.